United States Patent [19]
Reinsch

[11] 3,767,298
[45] Oct. 23, 1973

[54] MOTION PICTURE CAMERA WITH MEANS FOR MAKING "TIME" EXPOSURES

[75] Inventor: Herbert Reinsch, Kongen, Germany

[73] Assignee: Robert Bosch Photokino GmbH, Stuttgart, Germany

[22] Filed: Dec. 4, 1972

[21] Appl. No.: 312,121

[30] Foreign Application Priority Data
Dec. 4, 1971 Germany.................. P 21 60 277.7

[52] U.S. Cl.................. 352/169, 352/121, 352/137
[51] Int. Cl. ......................................... G03b 21/38
[58] Field of Search..................... 352/137, 169, 121

[56] References Cited
UNITED STATES PATENTS
| | | | |
|---|---|---|---|
| 2,462,302 | 2/1949 | Bolsey................................ | 352/169 |
| 3,603,678 | 9/1971 | Anderl................................ | 352/169 |

Primary Examiner—Monroe H. Hayes
Attorney—Michael S. Striker

[57] ABSTRACT

A motion picture camera wherein the shutter is adjustable by an electric motor for the making of normal exposures at a relatively high frequency and for the making of long or "time" exposures at a selected lower frequency. The shutter is at a standstill during the making of each long exposure and is rotated only between successive long exposures to overlie the light-admitting opening during film transport. The adjustment for the making of long exposures takes place in automatic reponse to rotation of a selector for the desired number of long exposures. Upon completion of the last long exposure, the shutter is automatically reset for the making of normal exposures and the motor is arrested.

15 Claims, 3 Drawing Figures

MOTION PICTURE CAMERA WITH MEANS FOR MAKING "TIME" EXPOSURES

BACKGROUND OF THE INVENTION

The present invention relates to motion picture cameras in general, and more particularly to improvements in motion picture cameras which are provided with means for making "time" exposures in addition to individual exposures and/or normal exposures at one or more customary frequencies, such as 18 or 24 frames per second. Still more particularly, the invention relates to improvements in motion picture cameras wherein the so-called "time" exposures (hereinafter called second or long exposures) are made by adjusting the shutter in such a way that, in contrast to its normal operation, the shutter is idle while its blade or blades admit scene light so that the long exposures are terminated in response to renewed movement of the shutter.

It is already known to provide a motion picture camera with a shutter which is adjustable in such a way that its blade or blades are in motion during the making of normal exposures and that the blade or blades are at a standstill during the making of a long exposure. During the making of a series of long exposures, the shutter comes to a standstill immediately or shortly after completion of film transport by the length of a frame and remains at a standstill for an interval which can be selected in advance or which is dependent on the intensity of scene light. Long exposures are desirable when the scene light is weak, for example, during picture taking at night, dusk, dawn or with poor artificial illumination of the subject or scene. In many instances, a long exposure can take up one or more seconds or even a longer interval of time.

In presently known motion picture cameras which are provided with the just described adjustable shutter for use in the making of long exposures, the adjustment of the shutter is carried out by hand, i.e., the blade or blades must be manually moved to such position(s) that the light-admitting opening is free to receive scene light. In addition, the user of the camera must start an automatic actuating device for the film transporting mechanism so as to insure that the film is transported stepwise during intervals between the making of successive long exposures. The shutter must be reset by hand to assume its normal condition upon completion of the last long exposure. A drawback of such cameras is that the first and the last long exposures are not only likely but practically certain to be unsatisfactory because the amount of scene light which the respective film frames receive is not dependent exclusively on the aforementioned actuating device (which may but need not include photosensitive transducer means) but also on the skill and alertness of the operator. As a rule, the first and last long exposures are over- or under- exposed and the corresponding film frames must be removed from developed film prior to projection of images onto a screen or the like.

Another drawback of many presently known motion picture cameras which are provided with means for making long exposures is that the operator must be present during the entire interval while the camera makes long exposures. In most instances, the operator must actually count the number of actuations of the film transporting mechanism (this is detectable due to generation of noise which the film transporting mechanism creates during transport of film) in order to be in a position to reset the shutter and to arrest the motor upon completion of the last long exposure. This is a tedious task, especially if the camera is to make a large number of long exposures each of which consumes one or more seconds or an even longer interval of time. Therefore, the impatient operator is likely to prematurely interrupt the making of long exposures or the operator is likely to lose the count if the number of long exposures is high (for example, more than 100).

SUMMARY OF THE INVENTION

An object of the invention is to provide a motion picture camera with novel and improved means for the making of long exposures and with novel and improved means for controlling the long exposure making means in such a way that a single manipulation suffices to initiate the making of long exposures and to effect a termination of the making of long exposures after the camera has completed a desired number of long exposures.

Another object of the invention is to provide a motion picture camera wherein the completion of the last of a desired number of long exposures brings about automatic resetting of the camera for the making of normal exposures.

A further object of the invention is to provide a motion picture camera which is capable of making satisfactory long exposures as soon as and as long it is set for the making of such exposures so that the first and last long exposures are just as satisfactory as all other long exposures.

An additional object of the invention is to provide a motion picture camera wherein any desired number of long exposures can be made without necessitating any attention on the part of the operator, and wherein the preparation for making of long exposures is so simple that it can be carried out not only by professional or reasonably skilled amateur phtographers but also by inexperienced amateurs or beginners.

The invention is embodied in a motion picture camera which comprises means defining a light-admitting opening, film transporting means which is actuatable to place successive frames of motion picture film into register with the light-admitting opening, adjustable mobile shutter means which can assume a first condition (first setting of the camera) for the making of a first type of exposures (normal exposures) and a second condition (second setting of the camera) for the making of a second type of exposures (long exposures or "time" exposures with identical or different exposure times) during the making of which the shutter means is at a standstill between successive actuations of the film transporting means and is out of register with the light-admitting opening, and novel control means including selector means which is operable (preferably by hand) to change the condition of the shutter means from the first to the second condition and to select a desired number of exposures of the second type. The control means further preferably includes resetting means which is operable to change the condition of the shutter means from the second to the first condition in automatic response to completion of a desired (selected) number of exposures of the second type.

The camera further comprises an electric motor or analogous drive means for the shutter means, and the resetting means preferably includes means for automatically arresting the motor in response to completion of a selected number of exposures of the second type. The arrangement is preferably such that the motor is arrested as soon as it has completed the adjustment of the shutter means upon completion of the last exposure of the second type so that the shutter means then assumes the first condition and the camera is ready to make exposures of the first type.

The motor is preferably in circuit with a normally open switch which is temporarily closed in response to operation of the selector means (so that the motor can change the condition of the shutter from the first to the second condition) and is temporarily closed again in response to operation of the resetting means to enable the motor to change the condition of the shutter means from the second to the first condition.

In accordance with a further feature of the invention, the control means may further include generator means for producing signals which effect the actuation of film transporting means upon completion of each long exposure. The selector means includes or controls means (e.g., a multi-way switch) for starting the generator means in response to selection of a desired number of exposures of the second type and for arresting or deactivating the generator means in response to completion of a desired number of such exposures. The multi-way switch may form part of the resetting means for the shutter means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
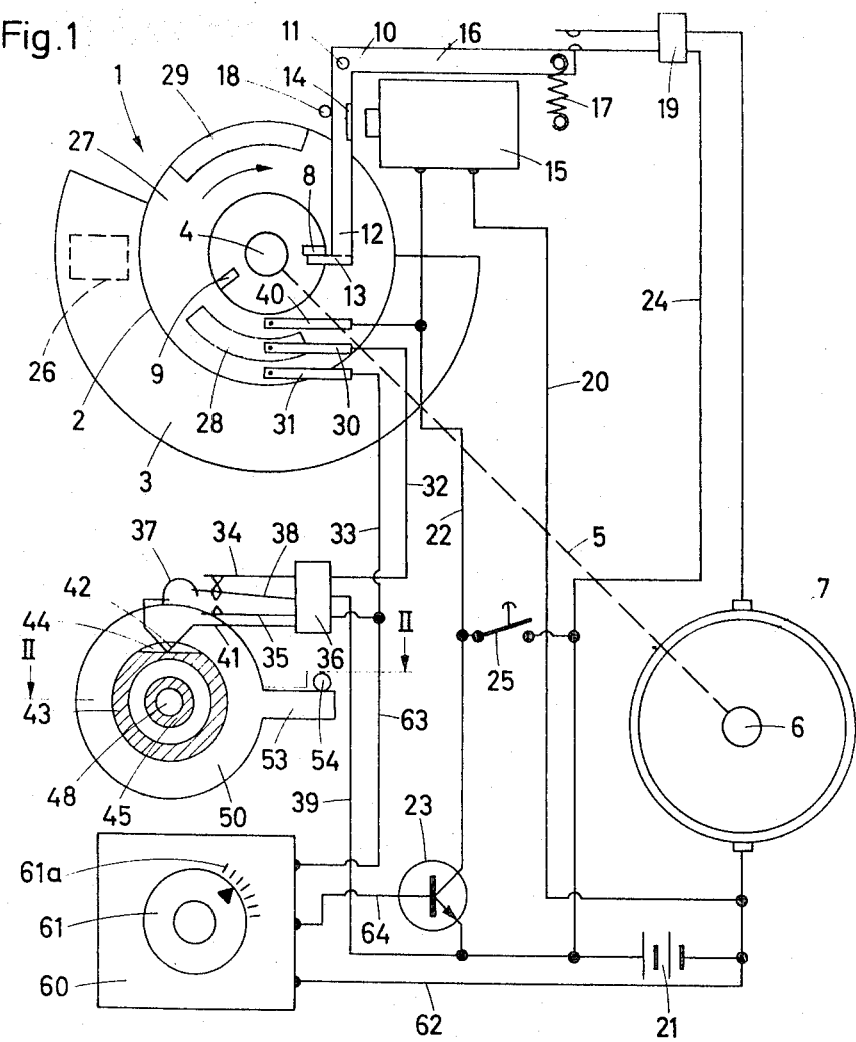
FIG. 1 is a fragmentary diagrammatic view of a motion picture camera which embodies the invention, with the shutter means shown in a condition it assumes prior to the making of normal exposures.

The motion picture camera which embodies the structure of FIG. 1 comprises an adjustable rotary shutter 1 mounted on a drum-shaped programming member 2 (hereinafter called drum or programming drum for short) and including a shutter blade 3. The programming drum 2 is mounted on a drive shaft 4 which forms part of the film transporting means and can receive torque from the output shaft 6 of an electric motor 7 by way of a suitable step-down transmission 5 indicated by a broken line. The motor 7 is installed in the body or housing of the motion picture camera. The programming drum 2 is provided with two axially parallel projections 8 and 9 which are spaced apart through a predetermined distance as considered in the circumferential direction of the drive shaft 4.

Each of the projections 8, 9 can be engaged by an intercepting member 10 here shown as a lever which is pivotable in the housing of the camera, as at 11, and one arm (12) of which is provided with a projection or tooth 13 movable into and from the path of orbital movement of projections 8 and 9 about the axis of the drive shaft 4. The arm 12 of the intercepting lever 10 is further provided with a plate 14 which constitutes the armature of an electromagnet 15. The other arm 16 of the intercepting lever 10 is biased clockwise, as viewed in FIG. 1, by a helical spring 17 and its end portion constitutes an actuating element or trip for a normally open electric switch 19. The switch 19 is connected in the circuit of the electric motor 7. The helical spring 17 tends to maintain the intercepting lever 10 in the illustrated operative position in which the tooth 13 of the arm 12 extends into the path of orbital movement of projections 8, 9 and the arm 12 abuts against a fixed stop 18 of the camera housing. The arm 16 of the intercepting lever 10 closes the normally open switch 19 when the electromagnet 15 attracts its armature 14 and causes the lever 10 to pivot counterclockwise so as to withdraw the tooth 13 from the path of the projections 8 and 9 on the drum 2.

The source 21 of electrical energy is a battery one pole of which is connected with the motor 7 and electromagnet 15 by means of a conductor 20. Another conductor 22 connects the electromagnet 15 with the other pole of the battery 21 by way of the collector-emitter circuit of a transistor 23. The other pole of the battery 21 is further connected with one contact of the normally open switch 19 by a conductor 24. The other contact of the switch 19 is connected with the motor 7. A normally open master switch 25 is connected between the conductors 22 and 24.

When the motion picture camera is not in use, the shutter 1 assumes a first conditon in which the blade 3 dwells in the angular position of FIG. 1 so that it overlies a light-admitting opening 26 defined by a wall of the camera body and located in front of a frame of the motion picture film, not shown. The tooth 13 of the lower arm 12 of the intercepting lever 10 engages and holds the projection 8 of the programming drum 2, i.e., the electromagnet 15 is deenergized and allows the spring 17 to contract so as to maintain the intercepting lever 10 in the operative position in which the arm 12 abuts against the fixed stop 18.

If the user wishes to make a series of normal or first exposures with relatively short exposure times of identical length, the master switch 25 is closed by hand or by remote control to energize the electromagnet 15. The circuit of the electromagnet 15 is then completed from the other pole of the battery 21, by way of conductor 24, master switch 25, conductor 22, the winding of electromagnet 15, conductor 20, and to the one pole of the battery 21. The energized electromagnet 15 attracts the armature 14 to pivot the intercepting lever 10 against the opposition of the spring 17 so that the arm 12 withdraws the tooth 13 from the path of the projections 8, 9 while the arm 16 closes the normally open switch 19 to thereby start the motor 7 which rotates the drive shaft 4 by way of the transmission 5. The shaft 4 further transmits motion to other parts of a customary film transporting mechanism which may include a conventional claw pull-down or intermittent serving to advance motion picture film by the length of a frame during that portion of each clockwise revolution of the shaft 4 when the shutter blade 3 overlies the light-admitting opening 26. The movements of the claw pull-down can be controlled by a set of cams (not shown)

on the drive shaft 4. Successive frames of motion picture film are exposed to scene light during that stage of each revolution of the shaft 4 when the shutter blade 3 is out of register with the ligh-admitting opening 26.

In order to arrest the motor 7 and to thus complete the making of normal or first exposures, the user causes or allows the master switch 25 to open. However, the opening of master switch 25 does not result in immediate stoppage of the motor 7 because the blade 3 of the shutter 1 must be arrested in the illustrated angular position in which it over-lies the ligh-admitting opening 26. The motor 7 can be arrested shortly before the blade 3 actually reaches the angular position of FIG. 1 because the inertia of moving parts of the shutter 1 and drive means therefor invariably insures that the programming drum 2 continues to turn until its projection 8 engages the tooth 13 on the lower arm 12 of the intercepting lever 10. The parts which insure that the opening of master switch 25 invariably results in stoppage of the blade 3 in the angular position of FIG. 1 include a plate-like contact member 27 on one of the end faces of the programming drum 2. The contact member 27 carries two arcuate strip-shaped insulating portions 28, 29 which are angularly offset relative to each other and are shown as being respectively spaced apart from and adjacent to the periphery of the drum 2. The arrangement may be such that the contact member 27 is a disk which consists of insulating material and is coated with a layer or current-conducting material save at the locations shown as being occupied by the insulating portions 28, 29, or the insulating portions can be pasted onto or otherwise secured to the current-conducting layer of the disk-shaped contact member 27. The purpose of the insulating portions 28, 29 is to effect an opening of the circuit of the electromagnet 15 in certain predetermined angular positions of the shutter blade 3. The insulating portions 28, 29 are respectively tracked by elastic contact elements 30, 31 the former of which is connected with the first contact 34 of a multi-way electric switch 36 by a conductor 32. The contact element 31 is connected to a second contact 35 of the switch 36 by a conductor 33. The third or median contact 38 of the switch 36 is movable by a bistable resilient element here shown as a leaf spring 37 and is connected with the other pole of the battery 21 by a conductor 39. The contact member 27 on the drum 2 is permanently engaged by a third elastic contact element 40 which is connected with the conductor 22. It will be noted that, when the shutter 1 is rotated by the motor 7 in a clockwise direction, as viewed in FIG. 1, 29 bypass the elastic contact element 40.

The moving parts 27, 28, 29 and the stationary parts 30, 31 cooperate in such a way that the electromagnet 15 is deenergized in response to opening of the master switch 25 with such a delay that the tooth 13 of the arm 12 can intercept the projection 8 in order to insure that the blade 3 overlies the opening 26 when the shutter 1 is at a standstill (first condition of the shutter). As explained above, the user of the camera can interrupt or terminate the making of a series of normal exposures by causing or allowing the master switch 25 to open. When the master switch 25 opens, the circuit of the electromagnet 14 remains completed from the other pole of the battery 21, by way of the conductor 39, contacts 38, 34 of the switch 36, conductor 32, contact element 30, contact member 27, contact element 40, conductor 22, the winding of electromagnet 15 and conductor 20 to the one pole of the battery 21 except, of course, if the master switch 25 happens to open at that stage of rotation of the shutter 1 when the contact element 30 engages the insulating portion 28. In all other instances, the shutter 1 continues to rotate until the insulating portion 28 reaches and is engaged by the contact element 30 to thus open the circuit of the electromagnet 15 which is deenergized and allows the spring 17 to contract so that the arm 12 moves against the stop 18 and the arm 16 of the intercepting lever 10 allows the switch 19 to open. The tooth 13 then extends into the path of and intercepts the oncoming projection 8 of the programming drum 2 while the switch 19 arrests the motor 7. As mentioned above, the last stage of angular movement of the projection 8 into abutment with the tooth 13 may take place due to inertia of the shutter and its drive means 4, 5, 6, 7 subsequent to opening of the motor circuit by the arm 16.

The bistable spring 37 extends along an arc of about 180 degrees and one of its ends is articulately connected to the median or third contact 38 of the switch 36. The other end of the spring 37 is articulately connected to an elastic displacing member or arm 41 which can be mounted in the casing of the switch 36 and has a pointed portion or follower 42 tracking the periphery of a rotary sleeve-like selector cam 43. The generally cylindrical peripheral surface of the selector cam 43 has a flat 44 which is engaged by the follower 42 when the displacing arm 41 maintains the spring 37 in the position of FIG. 1, i.e., in a position in which the median contact 38 of the switch 36 engages the contact 34 and is thus conductively connected with the elastic contact element 30.

If the user of the camera decides to turn the selector cam 43 in a clockwise direction, as viewed in FIG. 1, the displacing arm 41 pivots clockwise and causes the spring 37 to "snap over" to its other position in which the median contact 38 bears against the second contact 35 of the switch 36 and is thus electrically connected with the elastic contact element 31.

Figure 2:
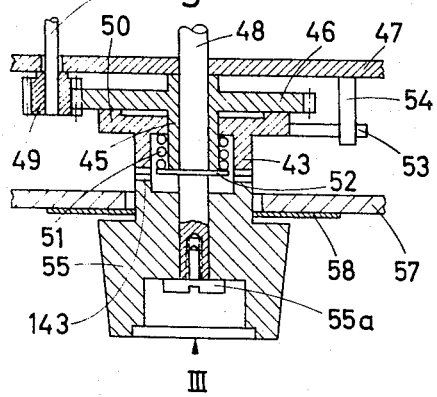
FIG. 2 is an enlarged sectional view as seen in the direction of arrows from the line II—II of FIG. 1.
Figure 3:
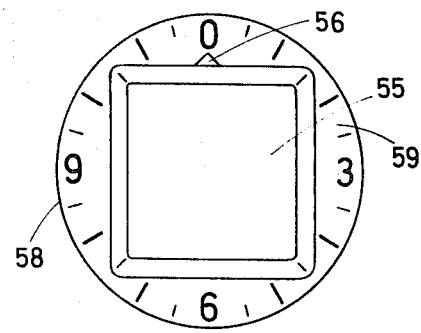
FIG. 3 is a front elevational view of the operating knob for selector means and the associated scale as seen in the direction of arrow III in FIG. 2.

The manner in which the sleeve-like selector cam 43 can be rotated by the user of the camera from the starting position of FIG. 1 is shown in FIG. 2. The cam 43 has a radially outwardly extending annular flange 50 which bears against one end face of a second rotary member 46 here shown as a spur gear. The latter has a cylindrical hub 45 which surrounds and is rotatable on a shaft or shank 48 journalled in an internal partition or wall 47 of the camera housing. The teeth of the gear 46 mate with the teeth of a pinion 49 which is driven stepwise by a shaft 49a of the film transporting mechanism. The means for biasing the flange 50 of the selector cam 43 against the gear 46 comprises a helical spring 51 which surrounds the hub 45 and reacts against a retainer 52 on the shank 48. The retainer 52 may constitute a split ring which extends into a circumferential groove of the shank 48. The flange 50 is provided with a radially outwardly projecting extension or arm 53 which normally abuts against an arresting post 54 secured to the wall 47. The operating means for rotating the selector cam 43 relative to the gear 46 comprises a handgrip member here shown as a knob 55 which is accessible at the outer side of a wall 57 forming an exposed part of the camera housing. The knob 55 is fixed to the shank 48 by a screw 55a or an analogous fastener and is coupled to the cam 43, as at 143. As shown in FIG. 3, the knob 55 has a polygonal (preferably square) outline and has an index 56 which can be moved into register with graduations 59 of a disk-shaped scale or dial 58 secured to the outer side of the wall 57. If desired, the scale 59 can be provided directly on the outer side of the wall 57. Also, the index 56 can be provided on the wall 57 and the graduations 59 are then provided on the knob 55 or on a scale secured to this knob. The graduations 59 of the scale 58 may represent different numbers of long exposures or different time intervals, such as seconds and fractions of seconds.

The motion picture camera of FIG. 1 can be set to make second or long exposures with exposure times which are slightly longer or much longer than the normal or first exposure times which are furnished by the shutter 1 when the camera is operated in the customary way.

Furthermore, the camera is provided with timer means which enables the user to select in advance the duration of second or long exposures so that the user need not even be present when the camera makes a desired number of long exposures each of which may take a fraction of a second or 1 or more seconds. During the making of long exposures, the shutter 1 assumes a second condition in which the blade 3 is out of register with the light-admitting opening 26 while the shutter 1 is at a standstill, and the making of a long exposure is terminated in response to renewed rotation of the shutter 1 by the drive shaft 4 which thereby causes the film transporting mechanism to place a fresh film frame into register with the opening 26 while the opening 26 is overlapped by the rotating blade 3. The parts 37, 41, 42 constitute a resetting means which automatically causes the shutter 1 to assume its first condition for the making of normal exposures in response to completion of the last long exposure.

In order to be capable of carrying out all of the just outlined functions, the camera is further provided with an electronic signal generator 60 which consitutes the aforementioned timer means and automatically initiates the actuation of film transporting mechanism at intervals corresponding to the selected duration of long exposures as soon as the camera is set by the knob 55 for the making of a selected number of long exposures. The signal generator is deactivated in response to completion of a selected number of long exposures.

The signal generator 60 comprises a rotatable knob 61 which can be turned by hand to insure that the signal generator 60 will furnish voltage signals at desired intervals. The one pole of the battery 21 is connected with one input of the signal generator 60 by a conductor 62, and a further conductor 63 connects another input of the signal generator 60 with the conductor 33, i.e., with the elastic contact element 31 and with the contact 35 of the switch 36. Still another conductor 64 connects the output of the signal generator 60 with the base of the transistor 23. The transistor 23 becomes conductive in response to voltage signals furnished by the signal generator 60. The latter is of conventional design and, therefore, the details of its circuit are not shown in the drawing. It suffices to say that the signal generator 60 is adjustable by hand through the intermediary of the knob 61 so that is can furnish voltage signals at selected intervals as long as it remains connected in circuit with the battery 21. The scale 61a on the casing of the signal generator 60 is provided with graduations representing seconds and/or fractions of seconds to facilitate the selection of intervals at which the conductor 64 transmits signals to the transistor 23. The latter can be said to constitute a variable resistor whose resistance decreases abruptly in response to a signal from the signal generator 60. A signal generator which can be utilized in the camera of the present invention is disclosed, for example, in U.S. Pat. No. 3,603,678, granted September 1971 for Anderl et al.

The operation of the motion picture camera during the making of a selected number of second or long exposures is as follows:

In the first step, the user of the camera turns the knob 61 to select a desired length of intervals between successive signals which the signal generator 60 would furnish to the base of the transistor 23. The adjustment of the knob 61 is facilitated by the provision of the scale 61a at the exposed side of the casing of the signal generator 60. If desired, the illustrated signal generator 60 can be replaced by another suitable signal generator, for example, by a signal generator which is controlled by a photoelectric transducer so that it furnishes to the transistor 23 signals at a frequency which is a function of scene brightness. The knob 61 is then expendable because the length of intervals between successive signals will depend on (and will vary as a function of) scene brightness.

In the next step, the user turns the operating knob 55 so that the index 56 pinpoints on the scale 58 that graduation 59 which is indicative of a desired projection time interval, i.e., of that time interval for which a film section including long exposed pictures shall later be projected on a screen with a projection frequency of 18 frames per second. For example, if a projection time of 6 seconds is desired, the camera must be ajusted to make 108 long exposures. The index 56 is then moved into register with number 6 of graduation 59. As the user rotates the knob 55 in a clockwise direction, as viewed in FIG. 1, 2 or 3, the selector cam 43 shares such angular movement of the knob 55 due to the provision of the coupling 143 whereby the extension 53 of the flange 50 moves away from the arresting post 54 on the internal wall 47 of the camera housing. During such rotation of the knob 55 from its starting position, the flange 50 slides along the adjacent end face of the gear 46. At the same time, the flat 44 at the periphery of the selector cam 43 moves relative to the follower 42 of the elastic displacing arm 41 which is mounted in the casing of the switch 36 in such a way that it invariably causes the follower 42 to bear against the selector cam 43. The spring 37 snaps over when the follower 42 engages the cylindrical portion of the peripheral surface of the selector cam 43 whereby the median contact 38 of the switch 36 is caused to engage the contact 35. This immediately completes the circuit of the electromagnet 15 from the other pole of the battery 21, by way of the conductor 39, contacts 38, 35 of the switch 36, conductor 33, elastic contact element 31, contact member 27, elastic contact element 40, conductor 22, the winding of electromagnet 15, conductor 20, and to the one pole of the battery 21. The energized electromagnet 15 attract the armature 14 to pivot the intercepting lever 10 counterclockwise against the opposition of the spring 17 whereby the tooth 13 is withdrawn from the path of the projection 8 on the drum 2 and the arm 16 closes the normally open switch 19 to start the motor 7 which rotates the drive shaft 4 by way of the transmission 5. After the shutter 1 completes about one-half of a revolution, the insulating portion 29 on the plate-like contact member 27 moves into the range of the elastic contact element 31 so that the circuit of the electromagnet 15 is interrupted and the spring 17 is free to return the intercepting lever 10 to the operative position shown in FIG. 1 with the exception, however, that the tooth 13 of the arm 12 extends into the path of the oncoming projection 9 on the programming drum 2. The arm 16 of the intercepting lever 10 allows the switch 19 to open and to arrest the motor 7 shortly before the projection 9 actually engages the tooth 13. The last stage of movement of the projection 9 into engagement with the tooth 13 preferably (but not necessarily) takes place due to inertia of the shutter 1. The same applies for the aforedescribed movement of the projection 8 into actual engagement with the tooth 13. As will be readily noted from an observation of FIG. 1, the blade 3 is out of register with the light-admitting opening 26 when the tooth 13 of the lower arm 12 of the intercepting lever 10 is engaged by the projection 9 of the programming drum 2 (second condition of the shutter). During the preceding rotation of the shutter 1 through a little more than 180° (the angular distance between the projections 9 and 8, considered in the circumferential direction of the shaft 4 and clockwise, as viewed in FIG. 1), the drive shaft 4 has caused the film transporting mechanism to move a fresh film frame into register with the opening 26 before the latter is exposed to scene light by the shutter blade 3.

When the spring 37 causes the median contact 38 of the switch 36 to engage the contact 35, the circuit of the signal generator 60 is completed from the other pole of the battery 21, by way of the conductor 39, contacts 38, 35 of the switch 36, conductor 63, signal generator 60, conductor 62, and to the one pole of the battery. After elapse of the interval which is selected by the knob 61, the generator 60 furnishes a first signal by way of the conductor 64 so that the transistor 23 becomes conductive and completes the circuit of the electromagnet 15 from the other pole of the battery 21, by way of the conductor 22 and transistor 23, the winding of the electromagnet 15, conductor 20, and to the one pole of the battery. The temporary energization of transistor 23 is of short duration but it suffices to energize the electromagnet 15 so that the intercepting lever 10 moves from its operative position against the opposition of the spring 17 to start the motor 7 by way of the switch 19 and to allow the shutter 1 to rotate to the extent which is necessary to move the insulating portion 39 beyond the elastic contact element 31. The circuit of the electromagnet 15 then remains completed (in spite of deenergization of the transistor 23) from the other pole of the battery 21, by way of the conductor 39, contacts 38, 35 of the switch 36, conductor 33, elastic contact element 31, contact member 27, elastic contact element 40, conductor 22, the winding of electromagnet 15, conductor 20, and to the one pole of the battery. However, the insulating portion 39 returns into the range of the elastic contact element 31 shortly before the shutter 1 completes a full revolution whereby the electromagnet 15 is deenergized and the motor 7 is arrested in response to opening of the switch 19. The tooth 13 returns into the path of the oncoming projection 9 under the action of the spring 17 and the shutter 1 is arrested while the blade 3 is out of register with the opening 26. The single revolution of the shutter 1 has sufficed to advance the film by the length of a frame so that scene light impinges on a previously unexposed frame. The signal generator 60 furnishes to the transistor 23 a second signal after elapse of the selected interval of time, and the second long exposure is thereby completed in response to renewed rotation of the shutter 1 through one full revolution.

The shaft 49a which receives torque from the shaft 4 of the shutter 1 by way of a suitable transmission (not shown) rotates the pinion 49 through a predetermined angle in response to each revolution of the shutter 1, i.e., in response to the making of each long exposure. The pinion 49 thereby rotates the gear 46 which, in turn, rotates the selector cam 43 counterclockwise due to friction between the gear 46 and the flange 50. In other words, the cam 43 turns incrementally or stepwise in a counterclockwise direction in response to each signal from the signal generator 60 whereby the extension 53 travels toward the arresting post 54. For example, the arrangement may be such that the selector cam 43 turns through an angle of 54 minutes (0.9°) in response to each transport of motion picture film by the length of a frame. The selector cam 43 reassumes the starting position of FIG. 1 in response to completion of 108 long exposures. Shortly before the extension 53 returns into actual engagement with the arresting post 54, the flat 44 on the peripheral surface of the selector cam 43 enables the displacing arm 41 to change the position of the spring 37 to such an extent that the latter "snaps over" and returns the median contact 38 of the switch 36 into engagement with the contact 34. This immediately completes the circuit of the electromagnet 15 from the other pole of the battery 21, by way of the conductor 39, contacts 38, 34 of the switch 36, conductor 32, elastic contact element 30 (which is then remote from the insulating portion 28 because the blade 3 does not overlap the opening 26), contact member 27, elastic contact element 40, conductor 22, the winding of electromagnet 15, conductor 20, and to the one pole of the battery. The electromagnet 15 attracts the armature 14 so that the intercepting lever 10 is pivoted counterclockwise and disengages the tooth 13 from the projection 9 while simultaneously closing the switch 19 to start the motor 7. The transmission 5 rotates the shutter 1 in a clockwise direction, as viewed in FIG. 1, so that the blade 3 moves toward the angular position of FIG. 1 in which it overlies the opening 26 (first condition of the shutter). Shortly before the blade 3 reaches such position, the insulating portion 28 moves into engagement with the elastic contact element 30 so that the electromagnet 15 becomes deenergized and allows the spring 17 to move the tooth 13 into the path of the oncoming projection 8 while the arm 16 allows the switch 19 to open and to thus arrest the motor 7.

The movement of the spring 37 in response to reengagement of the follower 42 with the central portion of the flat 44 further causes the switch 36 to open the circuit of the signal generator 60 so that the latter ceases to transmit signals to the transistor 23. Consequently, the camera is ready for the making of normal or first exposures which can be started in response to closing of the master switch 25.

The user of the camera can mount the camera housing on a tripod prior to turning the operating knob 55 in a direction to move the index 56 away from the zero graduation on the scale 59. The camera then makes a selected number of second or long exposures without any assistance on the part of the user, and the camera also resets itself for normal operation in automatic response to completion of the last long exposure.

The contact member 27 and the contact elements 30, 31 40 constitute a set of interrupter switches which are actuated by the programming drum 2 to control the condition of the electromagnet 15 and to thus control the motor 7 which, in turn, changes the condition of the shutter 1 in response to operation of the selector cam 43 and in response to completion of the last of a selected number of long exposures.

As mentioned above, the graduations 59 of the scale 58 can represent different numbers of long exposures of different intervals of time. In the latter instance, the desired number of long exposures is selected as follows: If the images of film frames which were exposed in the second condition of the shutter 1 (long exposures) are to be projected onto a screen at a frequency of 18 frames per second, the projection of 108 images will take up 6 seconds. Thus, the index 56 of the operating knob 55 for the selector cam 43 is moved into register with the graduation 59 which denotes an interval of 6 seconds. This is of assistance to an amateur who is normally not aware of the length of the interval required for the projection of a given number of images of film frames which were exposed in the second condition of the shutter 1.

An important advantage of the improved camera is that the user need not count the number of long exposures in order to be ready to change the condition of the shutter upon completion of the last of a desired number of long exposures. Also, the user need not convert the frequency of long exposures into the frequency at which the images of corresponding film frames are projected onto a screen. Still further, the control means of the camera (including the selector cam 43, the means including the knob 55 for operating the selector cam, the electromagnet 15, the resetting means 37, 41, 42, the signal generator 60, the normally open switch 19 and the interrupter switches controlled by the programming drum 2) insures that the first and last long exposures are just as satisfactory as all other long exposures because the duration of each long exposure is determined by the signal generator. Moreover, the user knows that the camera is set for the making of first or normal exposures as soon as the last long exposure is completed because the condition of the shutter 1 is changed in automatic response to return movement of the selector cam 43 to the starting position of FIG. 1. It was found that the improved camera can be entrusted to beginners or inexperienced amateurs for the making of highly satisfactory long exposures.

The master switch 25 and the electromagnet 15 can be said to constitute a camera release which must be actuated to start the making of normal exposures. In addition, the electromagnet 15 forms part of the control means in that it causes or enables the motor 7 to change the condition of the shutter 1 in response to operation of the selector cam 43 as well as in response to completion of the last long exposure.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising means defining a light-admitting opening; film transporting means actuatable to place successive frames of motion picture film into register with said opening; adjustable mobile shutter means adapted to assume a first condition for the making of a first type of exposures and a second condition for the making of a second type of exposures during the making of which said shutter means is at a standstill between successive actuations of said film transporting means and is out of register with said opening; and control means including selector means operable to change the condition of said shutter means from said first to said second condition and to select a desired number of exposures of said second type, and resetting means operable to change the condition of said shutter means from said second to said first condition in response to completion of said desired number of exposures of said second type.

2. A combination as defined in claim 1, further comprising drive means for said shutter means, said resetting means including means for arresting said drive means in response to completion of said desired number of exposures of said second type.

3. A combination as defined in claim 2, wherein said shutter means overlies said opening in said first condition thereof when said drive means is arrested.

4. A combination as defined in claim 3, wherein said drive means comprises electric motor means and said control means further comprises normally open electric switch means in circuit with said motor means, said selector means including means for effecting a temporary closing of said normally open switch means in response to operation of said selector means whereby said motor means changes the condition of said shutter means from said first to said second condition.

5. A combination as defined in claim 4, wherein said resetting means comprises means for effecting a temporary closing of said nomally open switch means in response to completion of said desired number of exposures of said second type whereby said motor means changes the condition of said shutter means from said second to said first condition.

6. A combination as defined in claim 5, wherein said control means further comprises electromagnet means energizable to close said normally open switch means, a source of electrical energy, and second switch means for connecting said electromagnet means in circuit with said source in response to operation of said selector means and said resetting means.

7. A combination as defined in claim 6, wherein said second switch means includes a plurality of series-connected interrupter switches and said control means further comprises programming means receiving motion from said motor means and arranged to open selected interrupter switches while said motor means changes the condition of said shutter means.

8. A combination as defined in claim 1, wherein said control means further comprises generator means for producing signals to effect the actuation of said film transporting means, said selector means including means for starting said generator means in response to selection of said desired number of exposures of said second type and for arresting said generator means in response to completion of said desired number of exposures of said second type.

9. A combination as defined in claim 8, wherein said generator means includes an electronic signal generator and said control means further comprises a source of electrical energy and switch means controlled by said selector means for connecting said signal generator with said source in the second condition of said shutter means.

10. A combination as defined in claim 9, wherein said switch means includes a multi-way switch having first and second contacts and a third contact controlled by said selector means to move from engagement with said first contact into engagement with said second contact in response to operation of said selector means whereby said second and third contacts connect said signal generator with said source.

11. A combination as defined in claim 1, wherein said selector means comprises a rotary member which is movable by hand from a starting position to a plurality of additional positions each corresponding to a different number of exposures of said second type, and means for moving said rotary member stepwise from a selected additional position toward said starting position in response to successive actuations of said film transporting means in said second condition of said shutter means.

12. A combination as defined in claim 11, wherein said means for moving said rotary member stepwise comprises a second rotary member receiving motion from said film transporting means and means for biasing one of said rotary members against the other rotary member.

13. A combination as defined in claim 11, further comprising arresting means for preventing the movement of said rotary member from a selected additional position beyond said starting position.

14. A combination as defined in claim 1, wherein said shutter means includes a rotary shutter which completes a full revolution in response to completion of each of said first and second types of exposures.

15. A combination as defined in claim 1, wherein said film transporting means comprises an electric motor and transmission means for moving said shutter means in response to actuation of said motor.

* * * * *